US009870590B2

(12) United States Patent
Lutnick et al.

(10) Patent No.: US 9,870,590 B2
(45) Date of Patent: Jan. 16, 2018

(54) DYNAMIC PRICE AXES

(75) Inventors: Howard W. Lutnick, New York, NY (US); Kevin M. Foley, New York, NY (US); Joseph Noviello, Summit, NJ (US); Michael Sweeting, Aldershot (GB)

(73) Assignee: BGC PARTNERS, INC., New York, NY (US)

( * ) Notice: Subject to any disclaimer, the term of this patent is extended or adjusted under 35 U.S.C. 154(b) by 0 days.

(21) Appl. No.: 11/570,069

(22) PCT Filed: Jul. 29, 2005

(86) PCT No.: PCT/US2005/027320
§ 371 (c)(1),
(2), (4) Date: Dec. 5, 2006

(87) PCT Pub. No.: WO2006/015336
PCT Pub. Date: Feb. 9, 2006

(65) Prior Publication Data
US 2007/0271171 A1 Nov. 22, 2007

Related U.S. Application Data

(60) Provisional application No. 60/592,415, filed on Jul. 29, 2004, provisional application No. 60/629,696, (Continued)

(51) Int. Cl.
G06Q 40/00 (2012.01)
G06Q 40/04 (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS 5,809,483 A 9/1998 Broka et al.
6,134,535 A 10/2000 Belzberg
(Continued)

FOREIGN PATENT DOCUMENTS

JP 02-266398 10/1990
JP 04-116692 4/1992
(Continued)

OTHER PUBLICATIONS

USPTO Office Action for U.S. Appl. No. 11/608,303, filed Dec. 8, 2006, in the name of Howard W. Lutnick et al., dated May 20, 2008 (11 pp.).

(Continued)

*Primary Examiner* — Rajesh Khattar
(74) *Attorney, Agent, or Firm* — Mark Miller

(57) ABSTRACT

The invention relates to systems and methods that provide a user interface for use with an electronic trading system. The interface displays a bid price axis and an ask price axis, as well as corresponding sizes, and an indication of the inside market. When the inside market changes in response to changing market conditions, the indication of the inside market changes locations before being restored to its original location by shifting the bid and ask prices in a direction parallel to the bid or ask price axis. The user may enter trade commands at different price levels using an input device. In order to help prevent such trade commands from being entered at erroneous price levels, the system locks a pointer associated with the input device to a price the user points to during the shifting process, unless the pointer is moved away from that price.

65 Claims, 8 Drawing Sheets

Related U.S. Application Data filed on Nov. 19, 2004, provisional application No. 60/653,056, filed on Feb. 14, 2005, provisional application No. 60/654,350, filed on Feb. 18, 2005, provisional application No. 60/678,383, filed on May 5, 2005.

(56) References Cited

U.S. PATENT DOCUMENTS

| | | |
|---|---|---|
| 6,211,880 B1 | 4/2001 | Impink, Jr. |
| 6,272,474 B1 | 8/2001 | Garcia |
| 6,339,440 B1 | 1/2002 | Becker et al. |
| 6,408,282 B1 | 6/2002 | Buist |
| 6,766,304 B2 | 7/2004 | Kemp et al. |
| 6,938,011 B1 | 8/2005 | Kemp et al. |
| 7,389,268 B1 | 6/2008 | Kemp et al. |
| 7,505,932 B2 | 3/2009 | Kemp et al. |
| 7,562,038 B1 | 7/2009 | Brumfield et al. |
| 7,574,397 B1 | 8/2009 | Kline et al. |
| 8,515,854 B2 | 8/2013 | Lutnick et al. |
| 8,671,044 B2 | 3/2014 | Lutnick et al. |
| 2002/0059129 A1 | 5/2002 | Kemp et al. |
| 2002/0077962 A1 | 6/2002 | Donato |
| 2002/0099644 A1 | 7/2002 | Kemp et al. |
| 2002/0116317 A1 | 8/2002 | May |
| 2002/0120546 A1 | 8/2002 | Zajac |
| 2002/0120547 A1 | 8/2002 | Zajac |
| 2002/0143690 A1 | 10/2002 | Mahajan et al. |
| 2002/0169703 A1 | 11/2002 | Lutnick |
| 2003/0000941 A1 | 1/2003 | Couraud |
| 2003/0004853 A1* | 1/2003 | Ram et al. ............ 705/37 |
| 2003/0023536 A1 | 1/2003 | Hollerman et al. |
| 2003/0023542 A1 | 1/2003 | Kemp et al. |
| 2003/0033239 A1 | 2/2003 | Gilbert |
| 2003/0065608 A1 | 4/2003 | Cutler |
| 2003/0069834 A1 | 4/2003 | Cutler |
| 2003/0149636 A1 | 8/2003 | Lutnick |
| 2004/0059668 A1 | 3/2004 | Togher |
| 2004/0070624 A1 | 4/2004 | Fushimi et al. |
| 2004/0103054 A1 | 5/2004 | Singer |
| 2004/0117292 A1* | 6/2004 | Brumfield et al. ............ 705/37 |
| 2004/0193524 A1 | 9/2004 | Almeida et al. |
| 2005/0125328 A1* | 6/2005 | Schluetter ............ 705/37 |
| 2005/0137962 A1 | 6/2005 | Penney et al. |
| 2005/0149429 A1 | 7/2005 | Kemp et al. |
| 2005/0187854 A1 | 8/2005 | Cutler et al. |
| 2005/0283415 A1 | 12/2005 | Studnitzer et al. |
| 2006/0069635 A1 | 3/2006 | Ram et al. |
| 2006/0190383 A1 | 8/2006 | May |
| 2006/0195289 A1 | 8/2006 | Kemp et al. |
| 2006/0235787 A1 | 10/2006 | Burns et al. |
| 2006/0259382 A1 | 11/2006 | Kemp et al. |
| 2007/0240053 A1 | 10/2007 | Lutnick et al. |
| 2009/0327119 A1 | 12/2009 | Noviello et al. |
| 2013/0339215 A1 | 12/2013 | Lutnick et al. |

FOREIGN PATENT DOCUMENTS

| | | |
|---|---|---|
| JP | H7-234772 | 9/1995 |
| JP | H09-054672 | 2/1997 |
| JP | 10-021036 | 1/1998 |
| JP | H10-21036 | 1/1998 |
| JP | 11-316640 | 11/1999 |
| JP | 2000-163191 | 6/2000 |
| JP | 2001-297195 | 10/2001 |
| JP | 2001-306293 | 11/2001 |
| JP | 2002-133113 | 5/2002 |
| JP | 2002-197281 | 7/2002 |
| JP | 2004-086744 | 3/2004 |
| JP | 2004-310352 | 11/2004 |
| JP | 2005-523506 | 8/2005 |
| JP | 2007-519091 | 7/2007 |
| WO | WO 03/040983 | 5/2003 |
| WO | WO 03/090032 | 10/2003 |
| WO | WO 2005/057353 | 6/2005 |

OTHER PUBLICATIONS

International Search Report for International Application No. PCT/US05/27320, dated Jan. 30, 2006.
U.S. PTO Office Action for U.S. Appl. No. 11/608,303; dated Apr. 24, 2009; 12 pages.
Pending U.S. Appl. No. 11/569,837, filed Nov. 20, 2006; 79 pages.
Pending U.S. Appl. No. 11/608,303; filed Dec. 8, 2006; 49 pages.
PCT Search Report and Written Opinion for International Application No. PCT/US2005/027174; dated Jan. 24, 2006; 6 pages.
European Search Report for EP Application No. 05779310.1 dated Mar. 6, 2008; 7 pages.
European Search Report for EP Application No. 05777630.4 dated Mar. 6, 2008; 8 pages.
U.S. PTO Office Action for U.S. Appl. No. 11/608,303; dated Oct. 2, 2009; 3 pages.
U.S. PTO Office Action for U.S. Appl. No. 11/569,837; 26 pages; dated Sep. 17, 2009.
Australian Examination Report for AU Application No. 2005267780; dated Nov. 24, 2009; 4 pages.
U.S. PTO Office Action for U.S. Appl. No. 11/569,837; 25 pages; dated Jul. 6, 2010.
U.S. PTO Office Action for U.S. Appl. No. 11/608,303; 14 pages; dated Feb. 5, 2010.
Pre Brief Conference Decision for U.S. Appl. No. 11/569,837 dated Jan. 28, 2011; 2 pages.
Advisory Action for U.S. Appl. No. 11/569,837 dated Jan. 19, 2011; 6 pages.
U.S. PTO Office Action for U.S. Appl. No. 11/608,303; 14 pages; dated Oct. 14, 2010.
Pre Brief Conference Decision for U.S. Appl. No. 11/608,303 dated May 18, 2011; 2 pages.
Advisory Action for U.S. Appl. No. 11/608,303 dated Apr. 21, 2011; 2 pages.
Japanese Office Action for Application No. 2007-523872 dated Mar. 15, 2011; 6 pages (including English Translation).
AU Examination Report for AU Application No. 2005267739 dated Mar. 13, 2008; 1 page.
Notice of Acceptance for AU Application No. 2005267780 dated Feb. 3, 2010; 4 pages.
Notice of Allowance for U.S. Appl. No. 11/608,303; 7 pages; dated Jun. 29, 2011.
JP Office Action for Application No. 2007-523872; dated Aug. 16, 2011; 7 pages (includes English Translation).
JP Office Action for Application No. 2007-523891; dated Aug. 16, 2011; 4 pages (includes English Translation).
JP Office Action for Application No. 2007-523872; dated Jan. 4, 2012; 7 pages (includes English Translation).
JP Office Action for Application No. 2007-523891; dated May 22, 2012; 8 pages (includes English Translation).
Tokyo Stock Exchange, Operational Systems Division, "Futures and Options Trading System, Operational Manual of Trading Terminals," Aug. 1998, 2-1, 5-1, 7-1, 17, 21, 22, 25, 26; 14 pages.
AU Examination Report for AU Application No. 2010201573 dated Jun. 1, 2012; 4 pages.
CA Examination Report for CA Application No. 2574975 dated Feb. 9, 2012; 6 pages.
AU Examination Report for AU Application No. 2010201573 dated Jan. 19, 2012; 4 pages.
AU Examination Report for AU Application No. 2010201573 dated Oct. 9, 2012; 4 pages.
JP Office Action for Application No. 2007-523891; dated Oct. 2, 2012; 27 pages (includes English Translation).
AU Examination Report for AU Application No. 2009245833 dated May 27, 2011; 2 pages.
U.S. Notice of Allowance for U.S. Appl. No. 11/569,837 dated Oct. 9, 2012; 9 pages.
Money Match: Functional Specification, Aug. 1990, Version 1.0, by The Sequor Group Inc. Software Services.
AU Notice of Acceptance for AU Application No. 2009245833 dated Feb. 8, 2013; 3 pages.
JP Official Questioning for Application No. 2007-523872; dated Sep. 18, 2012; 8 pages (includes English Translation).

(56) References Cited

OTHER PUBLICATIONS

U.S. Notice of Allowance for U.S. Appl. No. 11/569,837; dated Jun. 24, 2013; 10 pages.
CA Examiner's Requisition for Application No. 2,574,975; dated Aug. 21, 2013; 5 pages.
JP Appeal Decision for Application No. 2012-8249; dated Aug. 13, 2013; 25 pages (w/English translation).
Notice of Allowance for U.S. Appl. No. 11/608,303; 10 pages; dated Jul. 8, 2013.
CA Examiner's Requisition for Application No. 2,574,979; dated Jul. 5, 2013; 3 pages.
U.S. Office Action for U.S. Appl. No. 13/969,580; dated Nov. 6, 2013; 24 pages.
U.S. Office Action for U.S. Appl. No. 13/969,580; dated Jul. 18, 2014; 27 pages.
CA Examiner's Requisition for Application No. 2,574,979; dated Sep. 23, 2014; 4 pages.
JP Office Action for App. No. 2013-011255; dated Feb. 12, 2014; 11 pages (w/English translation).
CA Examiner's Requisition for App. No. 2,574,975; dated Aug. 14, 2015; 8 pages.
CA Examiner's Requisition for App. No. 2,574,979; dated Jul. 13, 2015; 5 pages.
JP Office Action for App. No. 2013-011255; dated Jan. 13, 2015; 8 pages (w/English translation).
AU Patent Examiner Report No. 1 for App. No. 2013205932; dated Oct. 30, 2015; 2 pages.
AU Patent Examiner Report No. 1 for App. No. 2013245578; dated Dec. 9, 2015; 3 pages.
JP Office Action for App. No. 2013-011255; dated Jan. 5, 2016; 7 pages (w/English translation).
JP Office Action for App. No. 2015-138935 ; dated Jun. 14, 2016; 14 pages (w/English translation).
CA Patent Examiner Report for App. No. 2,574,979; dated Aug. 5, 2016; 6 pages.
JP Final Decision for App. No. 2015-138935 ; dated Feb. 14, 2017; 6 pages (w/English translation).
CA Patent Examiner Report for App. No. 2574979; dated Jul. 19, 2017; 4 pages.
CA Examiner's Requisition for App. No. 2,574,975; dated Aug. 19, 2016; 2 pages.

* cited by examiner

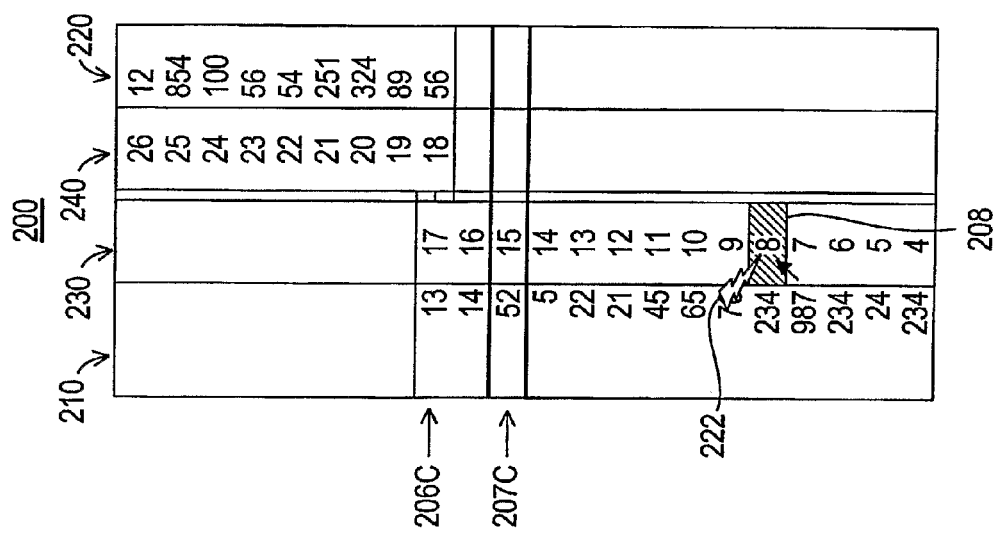

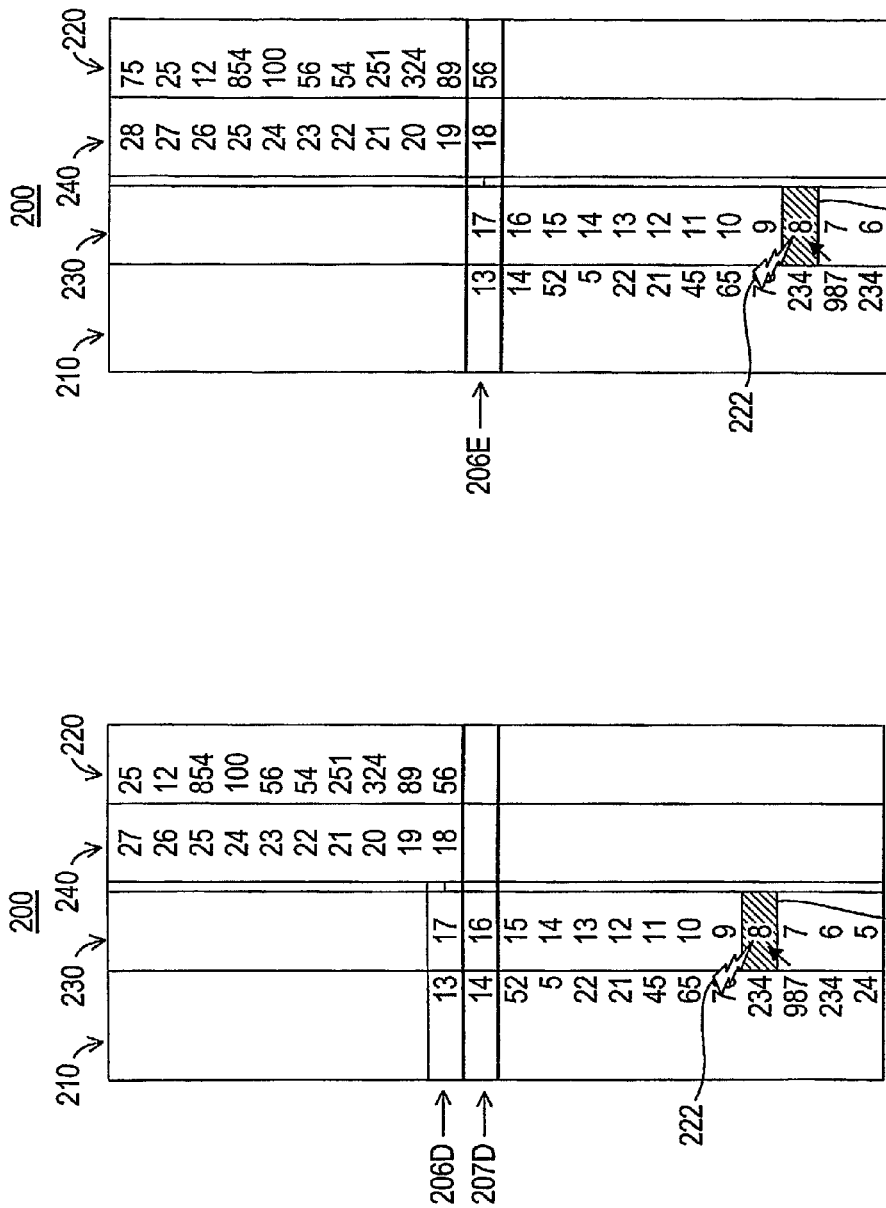

| 300A | | | |
|---|---|---|---|
| 315 → | 340 → | | 330 → |
| x854 | 25 | | |
| x100 | 24 | | |
| x56 | 23 | | |
| x54 | 22 | | |
| x251 | 21 | | |
| x324 | 20 | | |
| x89 | 19 | | |
| x56 | 18 | | |
| x437 | 17 | | |
| x6 | 16 | | |
| 5x37 | 15 | | 14 |
| 22x | | | 13 |
| 21x | | | 12 |
| 45x | | | 11 |
| 65x | | | 10 |
| 76x | | | 9 |
| 234x | | | 8 |
| 987x | | | 7 |
| 234x | | | 6 |
| 24x | | | 5 |
| 234x | | | 4 |
| 12x | | | 3 |

DYNAMIC PRICE AXES

CROSS-REFERENCES TO RELATED APPLICATIONS

The present application is a National Stage application which claims the benefit of International Application No. PCT/US05/27320, filed Jul. 29, 2005; which claims the benefit of U.S. provisional application No. 60/592,415, filed Jul. 29, 2004; and U.S. provisional application No. 60/629,696, filed Nov. 19, 2004; and U.S. provisional application No. 60/653,056, filed Feb. 14, 2005; and U.S. provisional application No. 60/654,350, filed Feb. 18, 2005; and U.S. provisional application No. 60/678,383, filed May 5, 2005, all of which are hereby incorporated by reference herein in their respective entireties.

FIELD OF THE INVENTION

This invention relates to electronic trading systems. More particularly, this invention relates to user interfaces and methods of use of user interfaces with electronic trading systems.

BACKGROUND OF THE INVENTION

Much trading today involves some computer support, from simple information delivery to sophisticated trading systems that automate transactions of goods and services. Electronic trading systems and methods have gained widespread acceptance for trading of a wide variety of items ranging from financial instruments (such as stocks, bonds, currency, futures, options, etc.) to household goods (such as old records, antiques, wines, etc.).

As electronic trading becomes more popular, an increasing number of traders are in need of new systems and methods to enter trade commands in a quick, efficient and accurate manner. In one method of electronic trading, bids and asks are submitted by traders to a trading system. Those bids and asks are then displayed by the trading system to other traders, and the other traders may then respond to the bids and asks by submitting sell (or hit) or buy (or lift) commands to the system.

Some implementations of such systems and methods of electronic trading show a bid column, an ask column and a single price axis. Bid and ask quantities are associated with their respective prices which are displayed in standard increments. While straightforward, this approach fails to unambiguously convey the inside market to a user, especially when a trading interface displays static price axes. This is because the user's attention is drawn to changes in quantity rather than changes in price. Moreover, this approach fails to show trade activity that was occurring in real-time.

Furthermore, market conditions change quickly as trades are executed at a fast pace. Price positions may therefore change rapidly and sometimes almost instantaneously. Users of such systems therefore face the risk of entering trade commands at erroneous price levels by, for example, using a mouse pointer to select a price that may have changed by the time the command is registered by the system. Such erroneous entries can lead to highly undesirable results in a rapidly changing market. Many such users are traders that track more than one active market by typically looking at multiple windows, interfaces or screens simultaneously, thereby increasing the likelihood that such erroneous entries occur.

Therefore, it would be desirable to provide systems and methods that clearly represent price fluctuations while ensuring quick, accurate and efficient execution of trades.

It would also be desirable to provide a user interface for electronic trading that is intuitive whereby the inside market is represented to the user by a dynamic display of the bid/ask prices and their associated quantities.

It would also be desirable to smoothly adjust the display of the bid/ask prices and their associated quantities while maintaining accurate and accessible axes for order entry at desired price levels.

It would also be desirable to enable users to manipulate the user interface using any suitable input device.

SUMMARY OF THE INVENTION

Therefore, it is an object of the invention to provide systems and methods that clearly represent price fluctuations while ensuring quick, accurate and efficient execution of trades.

It is another object of the invention to provide a user interface for electronic trading that is intuitive whereby the inside market is represented to the user by a dynamic display of the bid/ask prices and their associated quantities.

It is yet another object of the invention to smoothly adjust the display of the bid/ask prices and their associated quantities while maintaining accurate and accessible axes for order entry at desired price levels.

It is yet another object of the invention to enable users to manipulate the user interface using any suitable input device.

These and other objects are accomplished in accordance with the principles of the invention by providing systems and methods for displaying market information for, and allowing for electronic trading in, items through a user interface. More specifically, some embodiments of the invention provide an interface for use with an electronic trading system that displays bid prices and ask prices, preferably along different axes that may or may not be parallel to one another. Alternatively, the bid and ask prices may be displayed along a single axis. Each bid or ask price level may be displayed in a particular cell along one such axis. The cells may be consecutively ordered according to the price levels displayed therein. The interface may display at least one additional axis that is parallel to one of the price axes for displaying size information alongside each corresponding price. In some embodiments of the invention, the interface may provide a bid size axis and an ask size axis. The interface may also provide an indication of the inside market—i.e., the best (highest) bid and best (lowest) ask prices for which size exists—which may be centered within the interface. Preferably, each price axis includes vertically aligned cells, each displaying a distinct price level, wherein the inside market is displayed relatively midway between the lowest bid price and the highest ask price. In order to facilitate viewing the inside market, the cell displaying the best bid price for which size exists is preferably displayed alongside or adjacent to the cell displaying the best ask price for which size exists. Accordingly, the inside market may be displayed along an axis that is parallel to the price axes. Preferably, the price and size axes are vertical axes whereas the axis along which the inside market is displayed is a horizontal axis. Alternatively, the price and size axes may be curved parallel or intersecting lines. For example, each axis may be in the shape of a substantially circular arc such that the trading interface represents at least a portion of, or a full, a circle or an ellipse. In alternative embodiments of the present invention, the inside market is not displayed along a single axis.

When the inside market changes in response to changing market conditions, its indication changes locations from a first location, preferably centered within the interface to a second location along the price axes. Preferably, when the inside market changes in response to changing market conditions, a first cell that was populated with the previous best price in one of the price axes (a first axis) remains populated with that price whereas a second cell that was unpopulated in the first axis is populated with the new best bid or ask price. Cells along the first axis that are located between the first and second cells may also be populated with prices that lie between the previous and new best prices. The first and second cells may be separated by any number N of cells that are populated with prices lying between the previous and new best prices in the first axis. A third cell in the other price axis (a second axis) that is adjacent to the first cell and that displayed the other best price is depopulated as well as N cells along the second axis that are adjacent to the cells that were recently populated in the first axis. The second cell in the first axis and a fourth cell adjacent to it in the second axis may display the new best prices, thereby indicating the new inside market, which will have been displaced from the center of the interface by N+1 cells along a direction that is parallel to the price axes.

After the inside market changes and the indication of the new inside market is displayed in a location other than the center of the interface, the indication of the inside market may be restored to the center of the interface. This is accomplished by shifting the bid and ask prices in a direction parallel to the price axes in which they are displayed. More specifically, the shifting may be made on a cell by cell basis whereby all cells transition substantially simultaneously. Such shifting may therefore take place one row at a time whereby all rows transition substantially simultaneously. With each such transition, the number of populated cells in the first price axis may decrease whereas the number of populated cells in the other price axis may increase. In other embodiments of the present invention, the shifting may be made whereby the bid and ask prices transition substantially simultaneously from one cell to another. In yet other embodiments of the present invention, the shifting may occur at a rate that is greater than one row at a time. For example, the transitions may occur at a rate of two or more rows at a time. In alternative embodiments of the present invention, the shifting may be substantially continuous—e.g., pixel by pixel—such that it is displayed in a manner that is relatively seamless.

The speed at which the shifting occurs may be increased or decreased to the point of pausing or temporarily stopping the shifting process. Such speed may be defined by a user or may depend on user or market activity. During the shifting process, an appropriate method—e.g., highlighting, bolding, or any other suitable method—may be used to identify the inside market. If the inside market changes during the shifting process, the indication of the inside market may change substantially immediately—i.e., without transitioning through any intermediate rows—or at a predetermined rate to the price levels associated with the new inside market. The position of the inside market may be automatically recentered at any time or for any appropriate reason, such as through a user-entered command.

Moreover, when the inside market changes in response to changing market conditions, at least one of the prices may change locations between the bid price axis and the ask price axis. The sizes of orders that were submitted before they are accepted (or rejected), the sizes of completed trades and/or the user's share of the total size may also be displayed.

The user may use an input device to enter bid, ask, buy and sell orders and modify them before submission. Order entry regions may be displayed to the user to facilitate order submission. In some embodiments of the present invention, when a user moves a pointer to a cell that includes or is adjacent to a particular price, the system may lock the pointer to that price. That is, when the indication of the inside market shifts, the pointer may be repositioned such that it is pointing to the cell that includes or is adjacent to the same price, unless the user moves the pointer away from that cell.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 2A-2E are illustrations of exemplary interactive displays that may be displayed to users in accordance with certain embodiments of the present invention;

FIGS. 3A-3B are illustrations of alternative embodiments of exemplary interactive displays that may be displayed to users in accordance with certain embodiments of the present invention;

DETAILED DESCRIPTION OF THE INVENTION

The invention is directed to systems and methods that provide a trading interface that displays market information showing greater levels of movement and trade activity than prior art systems and methods, and that have added functionality, are easier to use and more intuitive compared to prior art systems and methods. The invention is also directed to user input devices for receiving user input. More particularly, the invention relates to customizable interfaces and input devices having arrangements, labels, colorization, programmed functionalities, and the like, that allows any user—e.g., a broker, a trader or any other market participant—to view market activity such as bids and asks or offers placed on particular items, and enter, execute and view trades intuitively, quickly and accurately. A bid (or buy command) may include a bid price—i.e., a dollar amount proposed to buy an issue or item—and a bid size—i.e., the volume of the particular bid. Similarly, an ask or offer may include an ask or offer price—i.e., a dollar amount proposed to sell an issue or item—and an ask or offer size—i.e., the volume of the particular ask or offer.

Further details of the invention are described below in relation to FIGS. 1-5.

Figure 1:
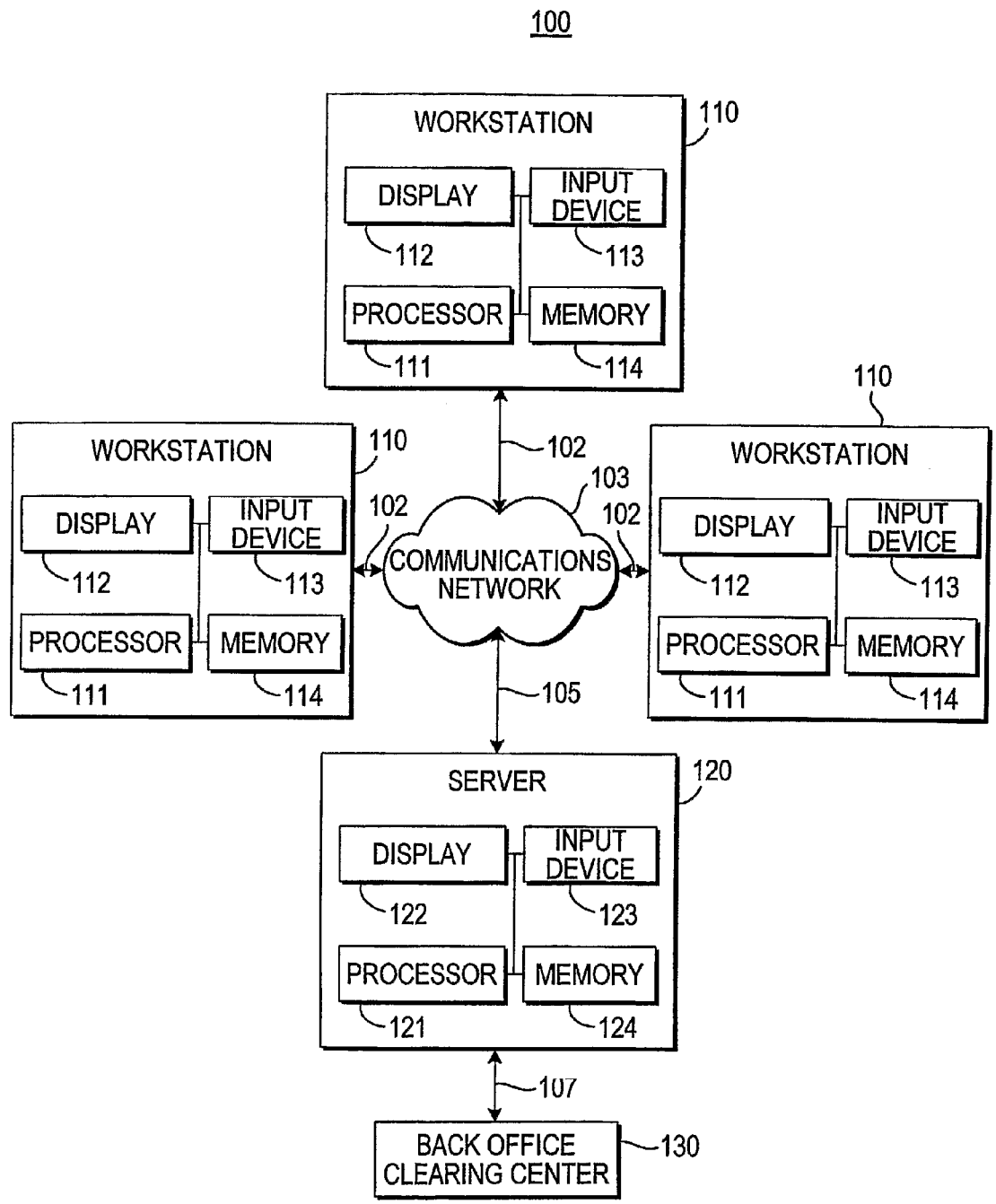
FIG. 1 is a block diagram of an exemplary system that may be used to implement the processes and functions of certain embodiments of the present invention.

Referring to FIG. 1, exemplary system 100 for implementing the invention is shown. As illustrated, system 100 may include one or more workstations 110. Workstations 110 may be local or remote, and are connected by one or more communications links 102 to computer network 103 that is linked via communications link 105 to server 120. Server 120 may be linked to back office clearing center 130 via communications link 107.

Server 120 may be any suitable server, processor, computer, data processing device, or combination of the same. Server 120 may be used to implement the governing logic that processes and executes orders and trades, and distributes trade and market information, including price and size information, to workstations 110. Computer network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by participants to enter bid, ask, buy and sell orders for the items being traded and view market activity corresponding to these items.

A typical workstation 110 may include processor 111, display 112, input device 113, and memory 114, which may be interconnected. In a preferred embodiment, memory 114 includes a storage device for storing a workstation program for controlling processor 111. Memory 114 may also store user configuration files, as described below, and other data on the storage device. The workstation program may include a trading application for running the trading interfaces shown in FIGS. 2-5 and displayed on display 112. Input device 113 may be used in conjunction with display 112 by users to enter bids/asks on desired items and to execute and monitor trades. Processor 111 may use the workstation program to receive trade information relating to the items being traded by multiple users of system 100, or other users, and display such information on display 112 or communicate such information to display 112.

Server 120 may include processor 121, display 122, input device 123, and memory 124, which may be interconnected. In a preferred embodiment, memory 124 includes a storage device for storing a server program that provides the governing logic for controlling processor 121. Processor 121 may use the server program to process orders and execute trades communicated from various workstations that are operated by multiple users of system 100, or other users, and communicate trade information, as well as bid and ask information, to workstations 110 and back office clearing center 130. More specifically, processor 121 may use the server program to process orders placed by users in response to users entering commands using input device(s) 113, and execute trades based on such orders, whenever applicable.

Back office clearing center 130 may be any suitable equipment, such as a computer, a laptop computer, a mainframe computer, etc., or any combination of the same, for causing trades to be settled and/or verifying that trades are settled. Communications link 107 may be any communications links suitable for communicating data between server 120 and back office clearing center 130, such as network links, dial-up links, wireless links, hard-wired links, etc.

FIGS. 2-5 illustrate user interfaces that may be implemented by and displayed on system 100 of FIG. 1, in accordance with the principles of the invention. For example, FIGS. 2-5 illustrate interactive displays and portions thereof that may be shown on display 112 and manipulated using input device 113.

FIGS. 2A-2E show a trading interface according to the invention that may be associated with electronic trading of financial instruments, such as interest-rate-related instruments, derivates thereof, or any other instruments and/or items. More specifically, FIGS. 2A-2E show interactive display 200 of a market at different times. While interactive display 200 shows multiple vertical axes or columns, it should be noted that the scope of the invention includes horizontal axes, curved axes and any other suitable axes or display regions. Moreover, the multiple axes discussed may be combined in a single axes that displays at least bid and ask prices. The same axis, or alternatively other axes, may display additional information such as sizes associated with these prices.

Interactive display 200 preferably includes a bid size column 210 on a first axis, an ask size column 220 on a second axis, a bid price column 230 on a third axis and an ask price column 240 on a fourth axis. Bid price column 230 and bid size column 210 represent the bid side of interface 200 while ask price column 240 and ask size column 220 represent the ask side of interface 200. Each of price columns 230 and 240 may include several cells, each of which displaying a particular price level. The cells may be consecutively ordered according to the price levels displayed therein. Each cell may or may not have a displayed border, including horizontal and/or vertical edges. Bid size column 210 preferably includes cells that display the sizes of bids available at the corresponding prices shown in bid price column 230. Similarly, ask size column 220 preferably includes cells that display the sizes of asks available at the corresponding prices shown in ask price column 240. A size corresponding to a particular price may be displayed in a cell that is adjacent to the cell displaying that price. A visual indicator may be used to accentuate the difference between columns associated with bids and asks. For example, bid size column 210 and/or bid price column 230 may be colored differently than ask size column 220 and/or ask price column 240.

In alternative embodiments of the present invention, each size cell may display at least two numbers: one denoting the size that was already accepted by the system, and one denoting the sizes of orders that were submitted before they are accepted (or rejected) by the system. The latter may represent the size in which the user participates or is interested. Alternatively, in other embodiments of the invention, the at least two numbers may be combined and a visual indicator may be used to indicate that the total size displayed includes both sizes mentioned above.

In some embodiments of the present invention, at least two columns may be displayed: one associated with the bid prices and another associated with the ask prices. The bid column may additionally display bid sizes associated with the bid prices, whereas the ask column may display sizes that are associated with the ask prices. In alternative embodiments of the present invention, a third column including sizes may be displayed such that the size associated with a bid price is displayed adjacent to that bid price and, similarly, such that the size associated with an ask price is displayed adjacent to that ask price. FIGS. 3A and 3B illustrate such embodiments.

FIGS. 3A and 3B show alternative trading interfaces according to the invention. More specifically, FIGS. 3A and 3B show interactive displays 300A and 300B, respectively, that preferably each include a bid price column 330 on a first axis and an ask price column 340 on a second axis. Each of these interactive displays may additionally include a size column that displays sizes corresponding to the prices in the bid and ask columns. For example, the cells in size column 315 of FIG. 3A that are adjacent to and horizontally aligned with—i.e., along the same horizontal level as—the cells in ask price column 340 display ask sizes that correspond to these prices, and the sizes displayed therein may be vertically aligned and offset to a particular side of column 315. The cells that are horizontally aligned with the cells in bid price column 330 display bid sizes that correspond to these prices, and the sizes displayed therein may be vertically aligned and offset to the opposite side of column 315. Alternatively, the bid and ask sizes may all be vertically aligned along the size column, as shown in size column 325 of interactive display 300B of FIG. 3B.

An indication of the inside market is shown by area 306 in each of FIGS. 3A and 3B. Area 306 may include a box that surrounds the cells displaying the inside market, thereby emphasizing the best bid and best ask in each of interactive displays 330A and 300B. Area 306 may be highlighted or its edges colored. While area 306 is indicated by a box, the indication may be provided using a reverse highlighting of the inside market or other suitable visual indicator or method, such as displaying the best prices and corresponding sizes in an underlined, italicized and/or bold fashion and/or using a unique or different font or font size. Alternatively, that no higher bids or lower asks are displayed may be a sufficient indication of the inside market instead of a physical visual indicator.

Preferably, the bid and ask price cells, as well as corresponding size cells, displaying the inside market are displayed along an axis that is parallel to price columns 330 and 340. Accordingly, the best bid and ask prices for which sizes exist may be displayed along the same horizontal level as the cell displaying the corresponding sizes to facilitate viewing the inside market. Therefore, the inside market may be displayed along a horizontal axis that is perpendicular to the vertical axes along which prices and sizes are displayed. If the bid price column is displayed to the right of the ask price column, then the size that is offset to the right in the size column may correspond to a bid size whereas the size that is offset to the left may correspond to an ask size.

Referring back to FIG. 2A-2E, an indication of the inside market is shown by areas 206A, 206B, 206C, 206D and 206E at different stages that occur pursuant to a change in the inside market. For example, each of areas 206A, 206B, 206C, 206D and 206E may include a box that surrounds the cells displaying the inside market on interactive display 200, thereby emphasizing the best bid and best ask in interactive display 200. Areas 206A, 206B, 206C, 206D and 206E may be highlighted or their edges colored. While each one of areas 206A, 206B, 206C, 206D and 206E is indicated by a box, the indication may be provided using a reverse highlighting of the inside market or other suitable visual indicator or method, such as displaying the best prices and corresponding sizes in an underlined, italicized and/or bold fashion and/or using a unique or different font or font size.

Alternatively, the fact that the highest displayed bid price is 14 and the lowest displayed ask price is 15 is an indication of an inside market having best bid-ask prices 14-15. It should be noted that there could be a difference of more than one increment between the highest displayed bid price and the lowest displayed ask price. This may be because the best bid price for which size exist is significantly lower than the best ask price for which size exists. For example, if all sizes entered at prices 13, 14 and 15 were canceled, the inside market would be 12-16. In such a situation, the best bid of 12 could be displayed on the same horizontal level as the best ask of 16. Alternatively, the best bid of 12 could be shown at a different horizontal level than the best ask of 16 whereby the horizontal levels corresponding to prices 13-15 are between the best bid and the best offer, yet show no size associated therewith.

Figure 4:
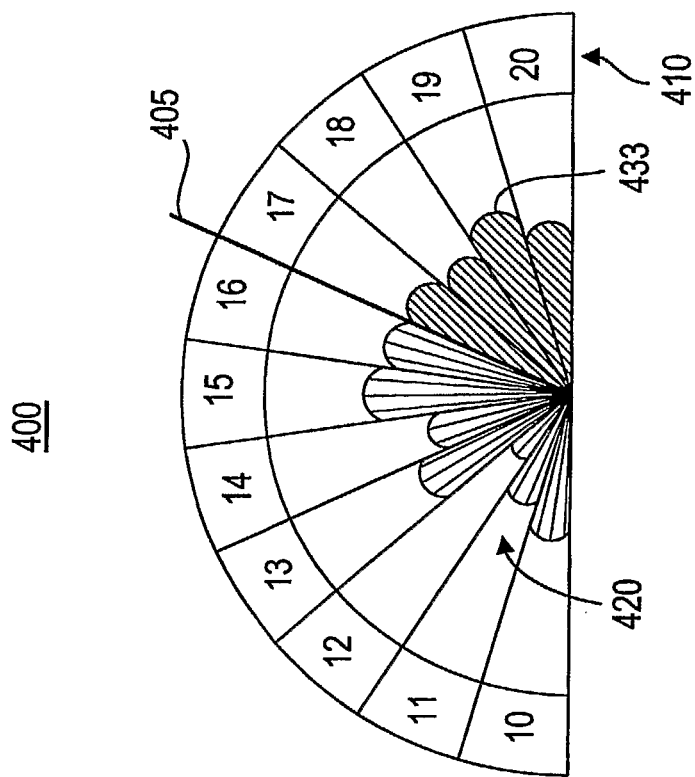
FIG. 4 is an illustration of an alternative embodiment of exemplary interactive displays that may be displayed to users in accordance with certain embodiments of the present invention.
Figure 5:
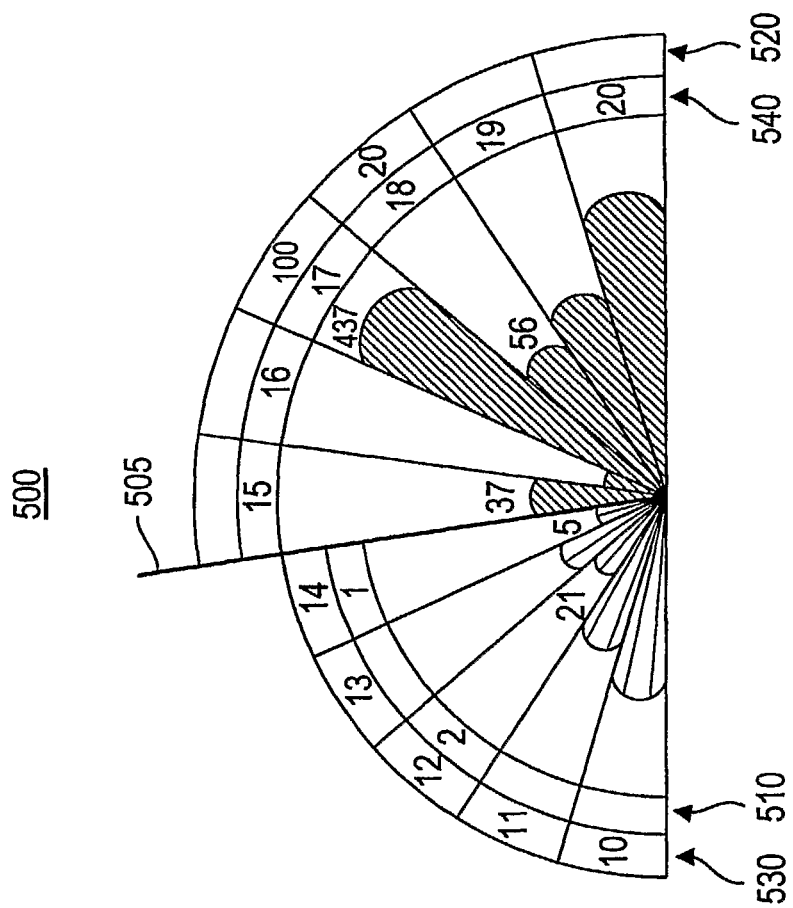
FIG. 5 is an illustration of another alternative embodiment of exemplary interactive displays that may be displayed to users in accordance with certain embodiments of the present invention.

The bid and ask price cells, as well as corresponding size cells, displaying the inside market may be displayed along an axis that is not parallel to price and size columns 210, 220, 230 and 240. Accordingly, the best bid price for which size exist is preferably displayed alongside or adjacent to the cell displaying the best ask price for which size exists to facilitate viewing the inside market. Accordingly, the inside market may be displayed along a horizontal axis that is perpendicular to the vertical axes along which prices and sizes are displayed. In alternative embodiments of the present invention, the inside market is not displayed along an axis that is perpendicular to the price axes. For example, the inside market may be displayed along a single price axis, as shown in FIG. 4, or not, as shown in FIG. 5.

Figure 2B:
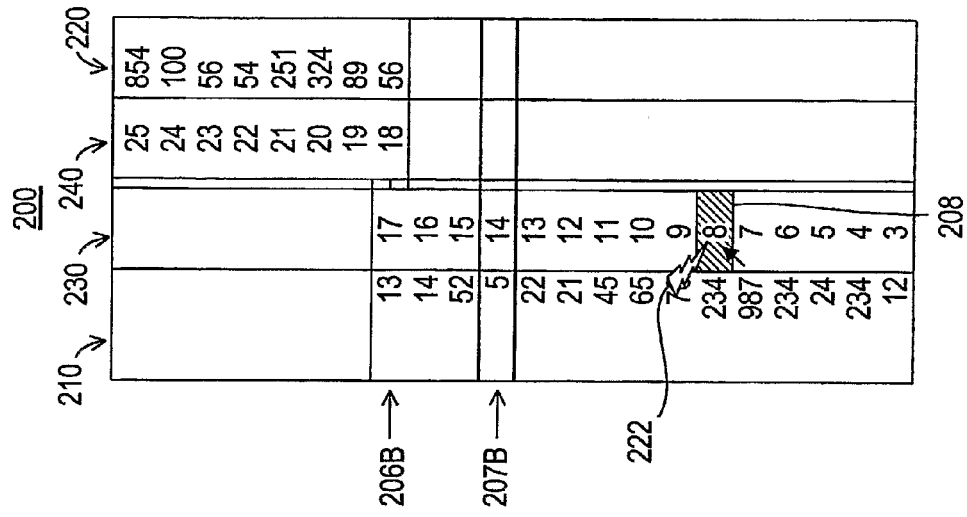
Figure 2A:
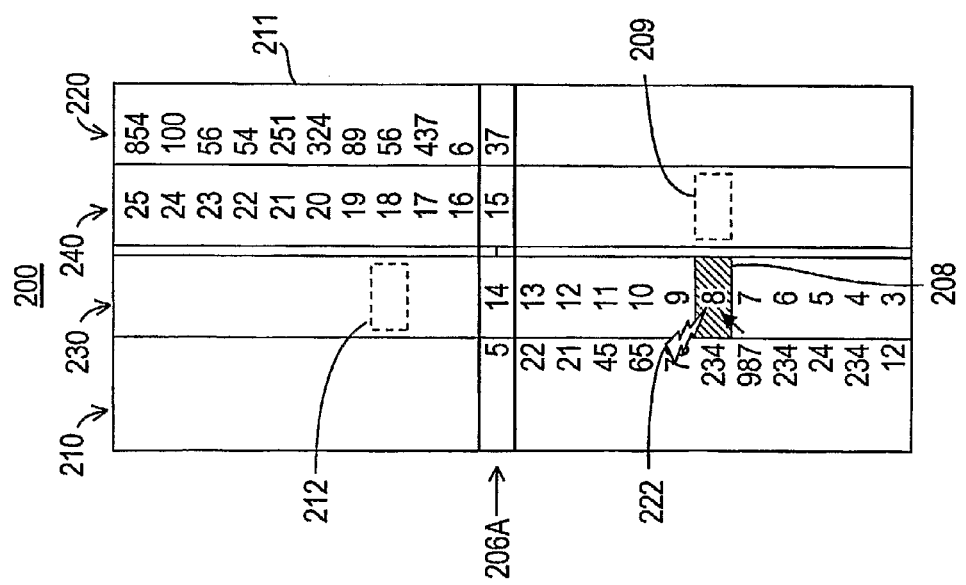

The inside market may initially include bid size 5, available at best bid price 14, and ask size 37, available at best ask price 15, as shown in area 206A of FIG. 2A. The inside market in area 206A is preferably displayed relatively midway between the lowest bid price and the highest ask price shown in interactive display 200. Accordingly, the inside market may be initially centered within interactive display 200, as shown in FIG. 2A. As market conditions and the inside market change, the location of the inside market may change along the price and size columns before shifting back to the center of interactive display 200 along with the rest of the displayed bid and ask prices and sizes.

FIG. 2B shows a change in the inside market shown in interactive display 200 as follows. As the inside market changes from best bid-ask prices of 14-15 to 17-18 and displayed in area 206B, the cells between areas 207B and 206B that are associated with bid prices and/or sizes may be populated while adjacent cells that are associated with ask prices and/or sizes may be depopulated. Moreover, the cells on the bid side of area 207B may remain populated with the same prices displayed on the buy side of area 206A of FIG. 2A, while the cells on the ask side of area 207B may be depopulated. The new inside market may include bid size 13, available at best bid price 17, and ask size 56, available at best ask price 18, as shown in area 206B of FIG. 2E. Such a change in the inside market may be due to a higher bid being entered and accepted at price 17 through system 100 of FIG. 1.

Generally, when the inside market changes in response to changing market conditions, it changes locations from a first location—e.g., along the center of the interface—to a second location along the price columns. Preferably, a first cell that was populated with the previous best price in the first price column remains populated with that price whereas a second cell that was unpopulated in the first price column is populated with the new best price. Cells along the first price column that are located between the first and second cell may also be populated with prices that lie between the previous and new best prices that pertain to that column. A third cell in the second price column that is adjacent to the first cell and that displayed the other previous best price is depopulated as well as other cells along that price column that are adjacent to the cells that were recently populated in the first price column. The second cell in the first price column and a fourth cell adjacent to it in the second price column may display the new best bid and ask prices, thereby indicating the new inside market, which will have been displaced from the center by at least one row of cells. The indication of the inside market may or may not initially transition from a first location to a second location one row at a time.

After the inside market changes and the new inside market is displayed in the second location—e.g., other than the center of interactive display 200—the inside market may shift back to the center of interactive display 200. Such a shifting process may be in the form of a transition in the location of the prices and sizes pertaining to the inside market. FIGS. 2C-2E show such a shifting process according to some embodiments of the present invention as follows. After the inside market 17-18 is displayed in area 206B as shown in FIG. 2B, the location of the inside market may transition to area 206C as shown in FIG. 2C, then to area 206D as shown in FIG. 2D, before transitioning back to, and being recentered at, area 206E as shown in FIG. 2E, which has a location that corresponds to that of area 206A of FIG. 2A.

At each step of the transitioning process, an appropriate method—e.g., highlighting, bolding, or any other suitable method—may be used to identify the inside market. Such a transitioning process may occur one row at a time at a speed that may be suitable for, e.g., a trader using a system that displays such a trading screen. The speed at which the transition may occur may be increased or, alternatively, decreased to the point of pausing or temporarily stopping the transitioning process. Such speed may be defined by a user or may depend on user or market activity. For example, as the user places an order during the shifting process, the transitioning process may slow down or temporarily pause (or proceed in a discernibly stepped fashion). This may occur for any order placed by the user or any other user during the shifting process or may occur when orders are entered at specific price levels. The shifting process may be accompanied by a corresponding shift in the location of all other prices and sizes in the price and size columns through transitions similar to the ones described above. With each such transition, the number of populated cells in the corresponding price and size columns may decrease. For example, columns 210 and 230 of FIG. 2B may include a larger number of populated cells than they previously included in FIG. 2A. Also, columns 210 and 230 of FIG. 2B may include a larger number of populated cells than they may subsequently include in each of FIGS. 2C, 2D and 2E. At the conclusion of the shifting process, columns 210 and 230 of FIG. 2E may include the same number of populated cells that they included in FIG. 2A.

The shifting process may be made in a direction parallel to the price and size columns. More specifically, each transition may be made on a cell by cell basis whereby all cells transition substantially simultaneously such that the location of each cell is replaced by another. Such a shifting process may therefore take place one row at a time whereby all rows transition substantially simultaneously. With each such transition, the number of populated cells in the first price column may decrease whereas the number of populated cells in the second price column may increase. In other embodiments of the present invention, the shifting may be made whereby the bid and ask prices transition substantially simultaneously from one cell to another. In such a situation, the cells shown in FIGS. 2A-2E may remain in the same location whereas the prices displayed therein may change locations or transition from one cell to another. In yet other embodiments of the present invention, the shifting process may occur at a rate that is greater than one row at a time. For example, the transitions may occur at a rate of two or more rows at a time. In alternative embodiments of the present invention, the shifting process may be substantially continuous—e.g., pixel by pixel—such that it is displayed in a manner that is relatively seamless.

If the inside market changes during the shifting process, the indication of the inside market may be shifted substantially immediately—i.e., without transitioning through any intermediate rows—or may transition at a predetermined rate to the price levels associated with the new inside market.

Alternatively, a user may take a particular action, such as clicking on area 206A (or 207B or 207C or 207D or 206E) in order to recenter the location of the inside market. The position of the inside market may be automatically recentered at any time or for any appropriate reason.

In yet another alternative embodiment of the recentering function according to the invention, recentering may be implemented according to a ratio. In this embodiment, the position of the inside market is not recentered to the center of the screen but rather offset from the center of the screen by some proportion to the change of the inside market. For example, the center line of the display, and consequently the display of the inside market, preferably shifts up a ¼ of a cell's height or other suitable amount for every tick that the inside market moves from the original position of the inside market—i.e., at the time the participant's trading session started, or other suitable time.

Thus, in the examples discussed above, columns 230 and 240 of FIGS. 2A-2E, as well as columns 330 and 340 of FIGS. 3A and 3B may be dynamic in that they may change based on changing market conditions. For example, both price columns 230 and 240 change based on a change in the inside market. The changes in the price columns may be characterized by a change in the location of a displayed price from one column to the other, or within the same column. The changes may also be characterized by a decrease in the number of populated cells that are displayed in one column and a corresponding increase in the number of populated cells that are displayed in the other column. Moreover, the position on the display may also change based on such changes in market conditions. Thus, it can be seen that, unlike other systems that use a common static price axis, some embodiments of the current systems use dual dynamic price axes.

Typically, in conventional trading systems, users enter their respective commands by typing the price and size in particular fields on an interactive display. Interactive trading according to the invention may be implemented by using input device 113 of FIG. 1 to enter an order as follows. Input device 113 of FIG. 1 may be a mouse, a trackball, a game controller, a touch pad, a keyboard, any combination of the same or any suitable input device(s) that the user may use to enter orders. Preferably, a user may for example enter a buy at price 8 (as illustrated in bid price column 230) by at least moving a pointer to cell 208 and clicking on that cell. Such an order may be entered as an additional bid at price 8, and the size displayed in the adjacent cell pertaining to bid size column 210 may be adjusted to take into account the size entered by the user.

Alternatively, a user may hit the bid—i.e., enter a sell—at price 8 by at least moving the pointer to and clicking on cell 209. Similarly, a user may enter a sell at price 18 (as illustrated in ask price column 240) by at least moving the pointer to and clicking on cell 211. Such an order may be entered as an additional ask at price 18, and the size displayed in the adjacent cell pertaining to ask size column 220 may be adjusted to take into account the size entered by the user. A user may lift the ask—i.e., enter a buy—at price 18 by at least moving the pointer to and clicking on cell 212.

The user may set a default size that he or she may subsequently modify using any appropriate method, such that each time the user enters an order at a selected price, the order is entered for the default size unless the user changes it. Alternatively, if a user is utilizing an input device having at least two buttons—e.g., a left click button and a right click button—the user may use one of the buttons to enter an order for a default size or use the other button to enter another size—e.g., a different default size—or choose a size, price, order type, or any combination of the same from a display window, dialog box, popup menu, toolbar, pane, command line or any other suitable trading interface. Moreover, if the user is utilizing an input device having scrolling capabilities, such as a wheel, the user may increase or decrease the default size by desired increments using the wheel. In some embodiments of the invention, whether the user clicks on a cell in a bid column or an ask column may determine whether the user is bidding, asking, buying or selling. In alternative embodiments of the invention, a right click may be associated with an order to hit (sell) or ask (place an order to sell) whereas a left click may be associated with an order to lift (buy) or bid (place an order to buy), and vice versa.

With respect to other implementations of scrolling, it should be noted that in systems and methods according to the invention, one can preferably use a scroll input to scroll up or down on a particular display. Preferably, the scrolling will not interrupt the regular functions of the program. Alternatively, the scrolling may momentarily pause the other operations that are being displayed at the time of the scrolling.

In some embodiments of the invention, a single click may actuate a trade at the displayed price and size. In other embodiments of the invention, a double click may actuate a trade. In the latter embodiments, a single click may cause an overlay window, a popup menu, a toolbar or a similar or different display or interface to be displayed. In these situations, following the first click, the pointer may warp to a button displaying the default selection in order to confirm the trade. In some embodiments of the invention, the pointer may warp to a button displaying the word "yes" or the like in order to confirm the trade following a first click. In other embodiments of the invention, a first or subsequent step in the order entry process, such as a first click by the user, may cause another display showing the price and size selected (or the default size). In yet other embodiments of the invention, a first click may cause another display window to be displayed. The display window may contain a set of alternative sizes from which the user may choose before confirming the order through a second click.

It should be noted that a single click may serve as an alternative to a double click whenever possible and appropriate, whereby a downclick may perform the same function as a first click, and a release or an upclick may perform the same function as a second click.

The unpopulated cells in the bid price, bid size, ask price and/or ask size columns may alternatively be used to implement and display a suitable order of any type at the corresponding price displayed on the same row in which the cell is located. Examples of suitable orders include a hit/lift all order, a stop order and/or a market if touched order.

In order to help prevent trade commands from being entered at erroneous price levels, the system may lock a pointer to a price the user points to according to some embodiments of the invention. Accordingly, when a user moves a pointer to a cell that includes or is adjacent to a particular price, the system may lock the pointer to that price. That is, when the indication of the inside market shifts, the pointer may be repositioned such that it is pointing to the cell that includes or is adjacent to the same price, unless the user moves the pointer away from that cell. Unless the user moves the pointer away from that cell, a command is entered for the price desired by the user when the user clicks to enter the command. In case the pointer is moved away from that cell, the pointer ceases to be repositioned to point to the same price. That a particular price is locked may be indicated by displaying a visual indicator, such as lightning bolt 222 of FIGS. 2A-2E and/or highlighting the appropriate cell. For example, after a transition of the position of the inside market to cells 206C, 206D and 206E, the pointer may be repositioned such that it points to cells 213, 214 and 215, respectively. The order entry process described above may be used in connection with, or adapted to, all interfaces shown in FIGS. 3-5.

As described above, the speed at which the shifting occurs may be increased or decreased to the point of pausing or temporarily stopping the shifting process based on user activity. Such speed may vary based on whether the pointer is used by the user to point or lock to a specific price level or whether the user moves the pointer away from the interactive interface. For example, the transitioning process may be slower when the pointer is pointing to a price or cell within the interface as compared to when the pointer is not located within the boundaries of the interface. Moreover, the closer the pointer is brought to the inside market, the slower the transitioning process may be.

The present invention may be practiced in embodiments that include any layout techniques, shapes or forms other than ones described above. For example, prices and sizes may be displayed along substantially circular arcs such that the resulting interactive interface represents a full circle or ellipse or at least a portion of a circle or ellipse, as shown in FIG. 4. Interactive interface 400 of FIG. 4 may include one or more arcs, such as arc 410, for displaying bid and ask prices, along with corresponding sizes thereto. Alternatively, semicircular area 420 may include pies, such as portion 433, that are selectively colored, filled or sized to convey corresponding indications of sizes that are associated with the prices shown in arc 410. In such embodiments, an indication of the inside market may be implemented through radial axis 405 which separates the best bid and ask prices for which sizes exist. Arc 410 and/or additional arcs may also display the sizes of orders that were submitted before they are accepted (or rejected), the sizes of completed trades and/or the user's share of the total size.

As another example, interactive interface 500 of FIG. 5 may include arcs 530 and 540 for displaying bid and ask prices, respectively. Interactive interface 500 may also include arcs 510 and 520 for displaying corresponding bid and ask sizes, respectively. Alternatively, interactive interface may include pies, such as portion 533, for conveying indications of sizes, whereas arcs 510 and 520 may display the user's share of the total bid and ask sizes, respectively, the sizes of orders that were submitted before they are accepted (or rejected) and/or the sizes of completed trades.

The information displayed in arcs 510 and 520 may instead be displayed in a single arc. Alternatively, such information may be included in each of arcs 530 and 540.

An indication of the inside market may be implemented through radial axis 505 which separates the best bid and ask prices for which sizes exist. Similar to the discussion of FIG. 2, the inside market may initially include bid size 5, available at best bid price 14, and ask size 37, available at best ask price 15. As market conditions and the inside market change, the location of the inside market may change along arcs 530 and 540 before shifting back to its original location along with the rest of the displayed bid and ask prices and sizes. The indication of the inside market may be set to default to any location including one that lies at the center of the interface.

The interactive displays described herein may be used in any kind of trading application, system or exchange such as auction trading systems, interactive matching systems, automated matching systems, price improvement systems, FIFO (First In, First Out) systems, RFQ (Request for Quote) systems, etc., and may be applied to the trading of any types of items. This includes cases where users are or are not granted exclusive rights to trade, cases where users are or are not provided with a share of a trade based on their status or market role, the stage during which they start or join a trade and/or their degree or extent of participation, cases where users are or are not provided with shares of a trade on a pro-rata basis based on existing agreements or distribution algorithms, or any combination of the same.

Moreover, the trading application described herein may be any suitable, software, hardware, or both configured to implement the features of the invention. The trading application may be located at a central location (e.g., a central server such as server 120 of FIG. 1) and instances thereof may be stored on workstations connected thereto (e.g., workstations 101 of FIG. 1). In another suitable approach, the trading application may reside among different locations (e.g., a network such as computer network 103 of FIG. 1).

The trading systems and methods described above, or variation thereof, may be implemented in conjunction with the interactive displays discussed or shown herein, or in conjunction with variations on those displays.

One of ordinary skill in the art should appreciate that the invention may be practiced in embodiments other than those described herein. For example, it will be understood that the size, shape, arrangement, color, and label of various portions of the interactive displays discussed or shown are examples shown for purposes of illustration only. It will be understood that modifications of any or all of the foregoing characteristics of these portions are within the scope of the invention. Embodiments discussed or shown herein may be applied to trading interfaces that use single static price axis, dual dynamic price axis, or any other suitable display.

It will be understood that the foregoing is only illustrative of the principles of the invention, and that various modifications can be made by those skilled in the art without departing from the scope and spirit of the invention, and the invention is limited only by the claims that follow.

What is claimed is:

1. A method comprising the steps of:
   displaying on a computer display a plurality of bid prices for an item along a first axis and a plurality of ask prices for the item along a second axis, including an indication of an inside market among the bid and ask prices in a central display location along the first and second axes, the central display location being within the central approximate one-third of the display range for display of prices;
   when the inside market changes from a first of the plurality of bid prices and a first of the plurality of ask prices to at least one of a second of the plurality of bid prices and a second of the plurality of ask prices, displaying the indication of the inside market in a second location along the first and second axes corresponding to a display location of the at least one of the second of the plurality of bid prices and the second of the plurality of ask prices, the second location being different than the central display location; and
   automatically by computer, in response to the change to the inside market, shifting the plurality of bid prices along the first axis of the computer display and the plurality of ask prices along the second axis of the computer display, the shifting comprising:
      displaying (1) the at least one of the second of the plurality of bid prices and the second of the plurality of ask prices, and (2) the indication of the inside market, at a third location at least part of the way between the second location and the central display location, the third location being different than the second and central display locations; and
      displaying (1) the at least one of the second of the plurality of bid prices and the second of the plurality of ask prices, and (2) the indication of the inside market, at the central display location,
   wherein the shifting of the plurality of bid prices and the plurality of ask prices occurs at a time, at an amount, and in a direction to substantially continuously maintain the display location of the indication of the inside market at or near the central display location.

2. The method of claim 1 wherein the second axis is parallel to but not collinear with the first axis.

3. The method of claim 1 wherein the first and second axes are the same axis.

4. The method of claim 1 wherein the first and second axes are curved axes.

5. The method of claim 1:
   wherein the display includes a pointer associated with an input device;
   and further comprising the step of, when the inside market changes at a time when the pointer is pointing to one of the prices on one of the axes, as the shifting of the plurality of bid and ask prices occurs, maintaining the input pointer at the pointed-to price by repositioning the input pointer on the display.

6. The method of claim 1 further comprising, when shifting the plurality of bid and ask prices, displaying along the first and second axes one or more bid and ask prices that were not displayed on the computer display immediately before the shifting.

7. The method of claim 1 wherein shifting the plurality of bid and ask prices comprises shifting the plurality of bid and ask prices on a pixel by pixel basis on the computer display.

8. The method of claim 1 wherein shifting the plurality of bid and ask prices comprises transitioning the plurality of bid and ask prices on a cell by cell basis.

9. The method of claim 1 wherein shifting the plurality of bid and ask prices occurs at a particular speed.

10. The method of claim 9 wherein said speed is set by a user of the computer display.

11. The method of claim 9 wherein said speed is based on market activity.

12. The method of claim 9 wherein said speed decreases when a user of the computer display enters a command to trade the item.

13. The method of claim 1 wherein shifting the plurality of bid and ask prices occurs at a slower speed when a pointer associated with an input device is pointing to one of the plurality of bid and ask prices than when the pointer is not pointing to any of the plurality of bid and ask prices.

14. The method of claim 1 wherein:
the shifting to maintain the display location of the inside market is at an amount that is a ratio less than one of the distance by which the display location of the inside market changes.

15. The method of claim 1 further comprising receiving a command to trade the item from a user.

16. The method of claim 1 further comprising, substantially at the same time as shifting the plurality of bid and ask prices, repositioning a pointer associated with an input device associated with the computer display such that the pointer is pointing to a price previously pointed to prior to the change in the inside market.

17. The method of claim 1 further comprising the step of:
displaying on the computer display a plurality of sizes along a third axis that is parallel to but not collinear with the first axis, wherein at least one of the plurality of sizes corresponds to at least one order on the item for a price displayed in a location along the first axis that is aligned with a location of the at least one of the plurality of sizes.

18. The method of claim 17 further comprising the step of:
displaying on the computer display a second plurality of sizes along a fourth axis that is parallel to but not collinear with the second axis, wherein at least one of the second plurality of sizes corresponds to at least one order on the item for a price displayed in a location along the second axis that is aligned with a location of the at least one of the second plurality of sizes.

19. A method for displaying market information for an item, the method comprising:
displaying on a display of a computer a plurality of bid prices along a first axis and a plurality of ask prices along a second axis;
displaying on the display an indication of an inside market in a first location along the first and second axes;
when the inside market changes from a first of the plurality of bid prices and a first of the plurality of ask prices to at least one of a second of the plurality of bid prices and a second of the plurality of ask prices, by computer on the computer display, displaying the indication of the inside market in a second location along the first and second axes corresponding to a display location of the at least one of the second of the plurality of bid prices and the second of the plurality of ask prices, the second location being different than the first location;
following the displaying of the indication of the inside market in the second location, automatically by computer shifting the plurality of bid prices along the first axis and the plurality of ask prices along the second axis of the display, the shifting being substantially continuous to appear visually smooth, the shifting comprising:
displaying on the display (1) the at least one of the second of the plurality of bid prices and the second of the plurality of ask prices, and (2) the indication of the inside market, at a third location at least part of the way between the second location and the first location, the third location being different than the second and first locations; and
displaying on the display (1) the at least one of the second of the plurality of bid prices and the second of the plurality of ask prices, and (2) the indication of the inside market, at the first location; and
substantially at the same time as shifting the plurality of bid and ask prices, repositioning a pointer associated with an input device on the display such that the pointer is pointing to a price previously pointed to prior to the change in the inside market.

20. A system for displaying market information for an item, the system comprising:
a server computer adapted to distribute a plurality of bid and ask prices associated with the item to a plurality of workstations that are coupled to the server, each of the plurality of workstations displaying a user interface, the server and workstations in combination being adapted to:
display on a computer display of at least one of the workstations a plurality of bid prices along a first axis and a plurality of ask prices along a second axis, including an indication of the inside market among the bid and ask prices in a central display location along the first and second axes, the central display location being within the central approximate one-third of the display range for display of price;
when the inside market changes from a first of the plurality of bid prices and a first of the plurality of ask prices to at least one of a second of the plurality of bid prices and a second of the plurality of ask prices, display the indication of the inside market in a second location along the first and second axes corresponding to a display location of the at least one of the second of the plurality of bid prices and the second of the plurality of ask prices, the second location being different than the central display location; and
automatically by computer, in response to the change to the inside market, shift the plurality of bid prices along the first axis of the computer display and the plurality of ask prices along the second axis of the computer display, the shifting comprising:
displaying (1) the at least one of the second of the plurality of bid prices and the second of the plurality of ask prices, and (2) the indication of the inside market, at a third location at least part of the way between the second location and the central display location, the third location being different than the second and central display locations; and
displaying (1) the at least one of the second of the plurality of bid prices and the second of the plurality of ask prices, and (2) the indication of the inside market, at the central display location,
wherein the shifting of the plurality of bid prices and the plurality of ask prices occurs at a time, at an amount, and in a direction to substantially continuously maintain the display location of the indication of the inside market at or near the central display location, the shifting being substantially continuous to appear visually smooth; and
substantially at the same time as shifting the plurality of bid and ask prices, maintain a display pointer associated with an input device to point at the same price on one of the axes as the pointer pointed to before the change in the inside market, by repositioning the input device pointer on the computer display.

21. A workstation of a computer trading system having an input device and being designed to display a user interface for display a plurality of bid and ask prices associated with an item traded on the trading system, the user interface adapted to:
- display on a display of the workstation the user interface a plurality of bid prices along a first axis and a plurality of ask prices along a second axis;
- display on the display an indication of the inside market in a first location along the first and second axes;
- when the inside market changes from a first of the plurality of bid prices and a first of the plurality of ask prices to at least one of a second of the plurality of bid prices and a second of the plurality of ask prices, display the indication of the inside market in a second location along the first and second axes corresponding to a display location of the at least one of the second of the plurality of bid prices and the second of the plurality of ask prices, the second location being different than the first location;
- following the displaying of the indication of the inside market in the second location, automatically by computer shift the plurality of bid prices along the first axis and the plurality of ask prices along the second axis, the shifting being substantially continuous to appear visually smooth, the shifting comprising:
- displaying (1) the at least one of the second of the plurality of bid prices and the second of the plurality of ask prices, and (2) the indication of the inside market, at a third location at least part of the way between the second location and the first location, the third location being different than the second and first locations; and
- displaying (1) the at least one of the second of the plurality of bid prices and the second of the plurality of ask prices, and (2) the indication of the inside market, at the first location; and
- substantially at the same time as shifting the plurality of bid and ask prices, reposition a pointer associated with the input device on the display such that the pointer is pointing to a price previously pointed to prior to the change in the inside market.

22. A method comprising the steps of:
- displaying on a computer display a plurality of bid prices along a first axis and a plurality of ask prices along a second axis, including an indication of an inside market in a first location along the first and second axes;
- when the inside market changes from a first of the plurality of bid prices and a first of the plurality of ask prices to at least one of a second of the plurality of bid prices and a second of the plurality of ask prices, displaying the indication of the inside market in a second location along the first and second axes corresponding to a display location of the at least one of the second of the plurality of bid prices and the second of the plurality of ask prices, the second location being different than the first location;
- following the displaying of the indication of the inside market in the second location, automatically by computer and as a result of recognizing the change in the inside market, shifting the plurality of bid prices along the first axis and the plurality of ask prices along the second axis, the shifting being substantially continuous to appear visually smooth, the shifting comprising:
- displaying (1) the at least one of the second of the plurality of bid prices and the second of the plurality of ask prices, and (2) the indication of the inside market, at a third location at least part of the way between the second location and the first location, the third location being different than the second and first locations; and
- displaying (1) the at least one of the second of the plurality of bid prices and the second of the plurality of ask prices, and (2) the indication of the inside market, at the first location; and
- substantially at the same time as shifting the plurality of bid and ask prices, automatically by computer repositioning a pointer associated with an input device associated with the computer display such that the pointer is pointing to a price previously pointed to prior to the change in the inside market.

23. The method of claim 22 further comprising:
when shifting the plurality of bid and ask prices, displaying along the first and second axes one or more bid and ask prices that were not displayed on the computer display immediately before the shifting.

24. The method of claim 22 wherein:
shifting the plurality of bid and ask prices comprises shifting the plurality of bid and ask prices on a pixel by pixel basis on the computer display.

25. The method of claim 22 wherein:
shifting the plurality of bid and ask prices comprises transitioning the plurality of bid and ask prices on a cell by cell basis.

26. The method of claim 22 wherein shifting the plurality of bid and ask prices occurs at a particular speed.

27. The method of claim 22 wherein said speed is set by a user of the computer display.

28. The method of claim 22 wherein:
shifting the plurality of bid and ask prices occurs at a slower speed when a pointer associated with an input device is pointing to one of the plurality of bid and ask prices than when the pointer is not pointing to any of the plurality of bid and ask prices.

29. One or more non-transitory computer memory devices, having stored therein instructions to cause one or more computers to:
- display, on a user interface of a computer trading system for trading of an item, a plurality of bid prices along a first axis and a plurality of ask prices along a second axis, with an inside market for the item displayed at a central display location along the first and second axes, the central display location being within the central approximate one-third of the display range for display of price;
- display, on the user interface a pointer associated with an input device;
- when the inside market changes from a first of the plurality of bid prices and a first of the plurality of ask prices to at least one of a second of the plurality of bid prices and a second of the plurality of ask prices, display the indication of the changed inside market at a second location on the axes, changed relative to the first location, the second location on the axes corresponding to a display location of the at least one of the second of the plurality of bid prices and the second of the plurality of ask prices, the second location being different than the central display location, with the prices of the axes remaining at substantially the same display locations before the change in inside market, with a pointer associated with an input device at a display location corresponding to a pointed-to price;

following the displaying of the indication of the inside market in the second location, and in response to the change in location of the inside market, automatically by computer shift at a particular speed the plurality of bid prices along the first axis and the plurality of ask prices along the second axis to reposition the indication of the inside market, the shifting comprising:

displaying (1) the at least one of the second of the plurality of bid prices and the second of the plurality of ask prices, and (2) the indication of the inside market, at a third location at least part of the way between the second location and the central display location, the third location being different than the second and central display locations; and displaying (1) the at least one of the second of the plurality of bid prices and the second of the plurality of ask prices, and (2) the indication of the inside market, at the central display location, wherein the shifting of the plurality of bid prices and the plurality of ask prices occurs at a time, at an amount, and in a direction to substantially continuously maintain the display location of the indication of the inside market at or near the central display location, wherein the particular speed at which the shifting occurs is based at least in part on a determination of at least one of (1) a location of the pointer on the user interface and (2) movement of the pointer on the user interface.

30. The non-transitory computer memory device(s) of claim 29 wherein:
the second axis is parallel to but not collinear with the first axis.

31. The non-transitory computer memory device(s) of claim 29 wherein the first and second axes are collinear.

32. The non-transitory computer memory device(s) of claim 29:
wherein the user interface includes display of a pointer associated with an input device;
the program(s) being further programmed to cause the computer(s) to, when the inside market changes at a time when the pointer is pointing to one of the prices on one of the axes, as the shifting of the plurality of bid and ask prices occurs, repositioning the input pointer on the display to maintain the input pointer at the pointed-to price.

33. The non-transitory computer memory device(s) of claim 29 wherein:
shifting the plurality of bid and ask prices comprises shifting the plurality of bid and ask prices on a pixel by pixel basis on the computer display.

34. The non-transitory computer memory device(s) of claim 29 wherein:
shifting the plurality of bid and ask prices comprises transitioning the plurality of bid and ask prices on a cell by cell basis.

35. The non-transitory computer memory device(s) of claim 29 wherein:
said speed is set by a user of the computer display.

36. The non-transitory computer memory device(s) of claim 29 wherein:
said speed is based on market activity.

37. The non-transitory computer memory device(s) of claim 29 wherein:
said speed decreases when a user of the computer display enters a command to trade the item.

38. The non-transitory computer memory device(s) of claim 29 wherein:

shifting the plurality of bid and ask prices occurs at a slower speed when a pointer associated with an input device is pointing to one of the plurality of bid and ask prices than when the pointer is not pointing to any of the plurality of bid and ask prices.

39. The non-transitory computer memory device(s) of claim 29 wherein:
the shifting to maintain the display location of the inside market is at an amount that is a ratio less than one of the distance by which the display location of the inside market changes.

40. The non-transitory computer memory device(s) of claim 29 further comprising:
substantially at the same time as shifting the plurality of bid and ask prices, repositioning a pointer associated with an input device associated with the computer display such that the pointer is pointing to a price previously pointed to prior to the change in the inside market.

41. The method of claim 19, wherein:
the smooth shifting is made pixel-by-pixel.

42. The method of claim 19, wherein:
the shifting is at a time and amount and in a direction to substantially continuously maintain the display location of the inside market at or near a central display location, the central display location being within the central approximate one-third of the display range for display of price.

43. The method of claim 22, wherein:
the smooth shifting is made pixel-by-pixel.

44. The method of claim 22, wherein:
the shifting is at a time and amount and in a direction to substantially continuously maintain the display location of the inside market at or near a central display location, the central display location being within the central approximate one-third of the display range for display of price.

45. An apparatus comprising:
at least one processor; and
memory storing instructions that, when executed by the at least one processor, configure the apparatus to:
receive information related to bids and asks for an item;
based on the received information, display on a computer display a plurality of bid prices and a plurality of ask prices along at least one axis, wherein a best bid price and a best ask price are displayed at a central display location along the at least one axis;
display on the computer display a pointer associated with an input device;
receive updated information related to at least one of bids and asks for the item;
based at least in part on the received updated information, determine at least one of a new best bid price and a new best ask price, wherein the at least one of the new best bid price and new best ask price is displayed at a second display location along the at least one axis that is different from the central display location; and
automatically by computer, in response to determining the at least one of the new best bid price and new best ask price, shift at a particular speed at least one of (1) the plurality of bid prices and (2) the plurality of ask prices along the at least one axis of the computer display to transition the second display location of the at least one of the new best bid price and the new best ask price toward the central display location, wherein the particular speed at which the shifting occurs is based at least in part on a determination of at least one of (1) a location of the pointer on the display and (2) movement of the pointer on the display.

46. The apparatus of claim 45, wherein:
the particular speed at which the shifting the plurality of bid and ask prices occurs is set by a user of the display.

47. The apparatus of claim 45, wherein:
the particular speed at which the shifting the plurality of bid and ask prices occurs is based at least in part on market activity.

48. The apparatus of claim 45, wherein:
the particular speed at which the shifting the plurality of bid and ask prices occurs decreases when a user of the apparatus enters a command to trade the item.

49. The apparatus of claim 45, the instructions further configuring the apparatus to:
determine that the location of the pointer on the display corresponds to a location of one of the bid and ask prices on the display; and
in response to determining that the location of the pointer on the display corresponds to the location one of the bid and ask prices on the display, reduce the particular speed of the shifting of the plurality of bid and ask prices as compared to when it is determined that the location of the pointer on the display does not correspond to a location of any of the plurality of bid and ask prices on the display.

50. The apparatus of claim 45, the instructions further configuring the apparatus to:
determine that the pointer is moving on the display towards the location of the inside market; and
in response to determining that the pointer is moving on the display towards the location of the inside market, decrease the particular speed of the shifting as compared to when it is determined that the pointer is not moving towards the location of the inside market.

51. The apparatus of claim 50, wherein the amount that the particular speed is decreased is increased the closer the pointer moves towards the location of the inside market.

52. A non-transitory computer readable medium storing instructions that, when executed by at least one processor, cause the at least one processor to:
receive information related to bids and asks for an item;
based on the received information, display on a computer display a plurality of bid prices and a plurality of ask prices along at least one axis, wherein a best bid price and a best ask price are displayed at a central display location along the at least one axis;
display on the computer display a pointer associated with an input device;
receive updated information related to at least one of bids and asks for the item;
based at least in part on the received updated information, determine at least one of a new best bid price and a new best ask price, wherein the at least one of the new best bid price and new best ask price is displayed at a second display location along the at least one axis that is different from the central display location; and
automatically by computer, in response to determining the at least one of the new best bid price and new best ask price, shift at a particular speed at least one of (1) the plurality of bid prices and (2) the plurality of ask prices along the at least one axis of the computer display to transition the second display location of the at least one of the new best bid price and the new best ask price toward the central display location, wherein the particular speed at which the shifting occurs is based at least in part on a determination of at least one of (1) a location of the pointer on the display and (2) movement of the pointer on the display.

53. The non-transitory computer readable medium of claim 52, wherein:
the particular speed at which the shifting the plurality of bid and ask prices occurs is set by a user of the display.

54. The non-transitory computer readable medium of claim 52, wherein:
the particular speed at which the shifting the plurality of bid and ask prices occurs is based at least in part on market activity.

55. The non-transitory computer readable medium of claim 52, wherein:
the particular speed at which the shifting the plurality of bid and ask prices occurs decreases when a user of the apparatus enters a command to trade the item.

56. The non-transitory computer readable medium of claim 52, the instructions further causing the at least one processor to:
determine that the location of the pointer on the display corresponds to a location of one of the bid and ask prices on the display; and
in response to determining that the location of the pointer on the display corresponds to the location one of the bid and ask prices on the display, reduce the particular speed of the shifting of the plurality of bid and ask prices as compared to when it is determined that the location of the pointer on the display does not correspond to a location of any of the plurality of bid and ask prices on the display.

57. The non-transitory computer readable medium of claim 52, the instructions further causing the at least one processor to:
determine that the pointer is moving on the display towards the location of the inside market; and
in response to determining that the pointer is moving on the display towards the location of the inside market, decrease the particular speed of the shifting as compared to when it is determined that the pointer is not moving towards the location of the inside market.

58. The non-transitory computer readable medium of claim 57, wherein the amount that the particular speed is decreased is increased the closer the pointer moves towards the location of the inside market.

59. A method comprising the steps of:
receiving information related to bids and asks for an item;
based on the received information, displaying on a computer display a plurality of bid prices and a plurality of ask prices along at least one axis, wherein a best bid price and a best ask price are displayed at a central display location along the at least one axis;
displaying on the computer display a pointer associated with an input device;
receiving updated information related to at least one of bids and asks for the item;
based at last in part on the received updated information, determining at least one of a new best bid price and a new best ask price, wherein the at least one of the new best bid price and new best ask price is displayed at a second display location along the at least one axis that is different from the central display location; and
automatically by computer, in response to determining the at least one of the new best bid price and new best ask price, shifting at a particular speed at least one of (1) the plurality of bid prices and (2) the plurality of ask prices along the at least one axis of the computer display to transition the second display location of at least one of the new best bid price and the new best ask price toward the central display location, wherein the particular speed at which the shifting occurs is based at least in part on a determination of at least one of (1) a location of the pointer on the display and (2) movement of the pointer on the display.

60. The method of claim 59 wherein:
the particular speed at which the shifting the plurality of bid and ask prices occurs is set by a user of the display.

61. The method of claim 59 wherein:
the particular speed at which the shifting the plurality of bid and ask prices occurs is based at least in part on market activity.

62. The method of claim 59 wherein:
the particular speed at which the shifting the plurality of bid and ask prices occurs decreases when a user of the apparatus enters a command to trade the item.

63. The method of claim 59 further comprising:
determining that the location of the pointer on the display corresponds to a location of one of the bid and ask prices on the display; and
in response to determining that the location of the pointer on the display corresponds to the location one of the bid and ask prices on the display, reducing the particular speed of the shifting of the plurality of bid and ask prices as compared to when it is determined that the location of the pointer on the display does not correspond to a location of any of the plurality of bid and ask prices on the display.

64. The method of claim 59, further comprising:
determining that the pointer is moving on the display towards the location of the inside market; and
in response to the determination that the pointer is moving on the display towards the location of the inside market, decreasing the particular speed of the shifting as compared to when it is determined that the pointer is not moving towards the location of the inside market.

65. The method of claim 64, wherein the amount that the particular speed is decreased is increased the closer the pointer moves towards the location of the inside market.

\* \* \* \* \*